United States Patent
Aoyama et al.

(10) Patent No.: US 6,752,228 B2
(45) Date of Patent: Jun. 22, 2004

(54) TRACTOR WITH A CAB

(75) Inventors: Hitoshi Aoyama, Kashiba (JP); Seiichi Ishiizumi, Sakai (JP); Katsumi Yanagihara, Osaka (JP); Kuninosuke Iwata, Sakai (JP); Norihide Iwata, Sakai (JP); Takahiro Komine, Sakai (JP); Yutaka Inubushi, Sakai (JP); Shigeo Shoen, Osaka (JP)

(73) Assignee: Kubota Corporation, Osaka (JP)

( * ) Notice: Subject to any disclaimer, the term of this patent is extended or adjusted under 35 U.S.C. 154(b) by 153 days.

(21) Appl. No.: 10/081,890

(22) Filed: Feb. 22, 2002

(65) Prior Publication Data

US 2003/0015363 A1 Jan. 23, 2003

(30) Foreign Application Priority Data

Jul. 19, 2001 (JP) ........................................ 2001-219805

(51) Int. Cl.[7] .............................................. B62D 33/06
(52) U.S. Cl. ................. 180/89.12; 180/900; 296/190.01
(58) Field of Search ........................... 180/89.1, 89.12, 180/89.13, 89.18, 900, 312; 296/190.01, 190.04, 190.08, 190.06, 190.05, 190.11, 26.05, 26.04, 35.3

(56) References Cited

U.S. PATENT DOCUMENTS

| | | | | |
|---|---|---|---|---|
| 3,802,530 A | * | 4/1974 | Purcell et al. ............ | 180/89.12 |
| 4,121,680 A | * | 10/1978 | van der Lely ................ | 180/24 |
| 4,206,825 A | * | 6/1980 | van der Lely .............. | 180/329 |
| 4,270,621 A | * | 6/1981 | van der Lely ............. | 180/69.6 |
| 4,648,472 A | * | 3/1987 | van der Lely ................ | 180/24 |
| 4,650,242 A | * | 3/1987 | Obe et al. .............. | 296/190.08 |
| 4,669,564 A | * | 6/1987 | Kreutz ..................... | 180/89.12 |
| 4,669,565 A | * | 6/1987 | Miki et al. ............... | 180/89.12 |
| 4,781,260 A | * | 11/1988 | Morita et al. ............ | 180/89.12 |
| 4,791,996 A | * | 12/1988 | van der Lely ................ | 172/47 |
| 6,065,799 A | * | 5/2000 | Suwabe et al. ........ | 296/190.04 |

FOREIGN PATENT DOCUMENTS

| | | | | | |
|---|---|---|---|---|---|
| JP | 404008630 A | * | 1/1992 | .............. | 180/89.12 |
| JP | 11089318 | | 4/1999 | | |
| JP | 11171051 | | 6/1999 | | |
| JP | 11342756 A | * | 12/1999 | .............. | 180/89.12 |
| JP | 11342874 A | * | 12/1999 | .............. | 180/89.12 |
| JP | 2001001742 | | 1/2001 | | |
| JP | 2001106124 A | * | 4/2001 | .............. | 180/89.12 |
| JP | 02002145127 A | * | 5/2002 | .............. | 180/89.12 |

\* cited by examiner

*Primary Examiner*—Brian L. Johnson
*Assistant Examiner*—Bridget Avery
(74) *Attorney, Agent, or Firm*—Webb Ziesenheim Logsdon Orkin & Hanson, P.C.

(57) ABSTRACT

A tractor with a cab disposed rearwardly of a hood, the cab being mounted on a tractor body (T) including a body forming unit, the cab including a bottom wall defining left and right footrests. The cab has a total length larger than a total height thereof. The cab is arranged to have the footrests substantially level with a lower end of the body forming unit. The cab has an intermediate height level (x) lower than a height level of the hood.

27 Claims, 8 Drawing Sheets

TRACTOR WITH A CAB

BACKGROUND OF THE INVENTION

1. Field of the Invention

This invention relates to a tractor with a cab, and particularly to such a tractor that is used in agricultural operations.

2. Description of the Related Art

Large and medium size agricultural tractors with cabs are widespread. In recent years, there have been increasing demands for small tractors with cabs. In greenhouse cultivation in particular, operations are carried out in an environment of high temperature, a hot and humid environment, or in a dust-laden environment. Such conditions induce a strong desire to drive a tractor with a cab into a greenhouse.

A greenhouse is often designed to have a ceiling of minimum height under such restrictions as a reduction of equipment cost, strength, and a reduction of running cost of a temperature adjuster. It is customary for the greenhouse to have a relative small and low entrance also.

Thus, a tractor with a cab must be constructed to have a small overall height in order to pass through the entrance of the greenhouse. Conventionally, a small overall height of the tractor is achieved by diminishing a wheel diameter or remodeling to provide a higher axle position than in a standard tractor, to be able to enter the greenhouse.

However, the cab tractor with an overall height reduced by the above measure to be movable through a greenhouse entrance has a lowered tractor body carrying a cab of standard size. Such a tractor body has a lower ground clearance than a standard tractor. The tractor with the low tractor body encounters restrictions as to the type of operation outside as well as inside the greenhouse; it cannot ride over ridges that a standard tractor can ride over. For example, the cab tractor with a reduced ground clearance to be able to move into and out of a greenhouse cannot work in a rice field where the wheels subside by large extents. To cope with such a situation, a troublesome operation such as changing of the wheels must be carried out. Thus, the cab tractor with a reduced minimum height has drawbacks in handling convenience and operability.

SUMMARY OF THE INVENTION

This invention has been made having regard to the prior art noted above, and its primary object is to provide a tractor with a cab, capable of easily moving into and out of a greenhouse with a low entrance, and having a sufficient ground clearance to be capable of performing a wide variety of operations as is a standard tractor, while securing a sufficient accommodation space for the operator.

Thus, this invention regards, as the starting technique, a tractor having a cab disposed rearwardly of a hood and mounted on a tractor body including a body forming unit, the cab including a bottom wall defining left and right footrests.

A first proposal made by this invention in fulfilling the above object in view of the starting prior art is that the cab has a total length larger than a total height thereof, and the cab is arranged to have the footrests substantially level with a lower end of the body forming unit. With this construction, the entire cab can be installed at a low level relative to the tractor body without reducing the total height of the cab. Since the total length of the cab is larger than the total height thereof, a driver's seat may be installed relatively rearward to secure a spatial allowance forwardly of the driver's seat.

A second proposal by this invention is that the cab has a total length larger than a total height thereof, and the cab has an intermediate height level lower than a height level of the hood. With this construction, the entire cab can be installed at a low level relative to the tractor body without reducing the total height of the cab. Here again, a driver's seat may be installed relatively rearward to secure a spatial allowance forwardly of the driver seated on the driver's seat.

A third proposal by this invention is that the cab has a total length larger than a total height thereof, the cab is arranged to have the footrests substantially level with a lower end of the body forming unit, and the cab has an intermediate height level lower than a height level of the hood. With this construction, naturally, the entire cab can be installed at a sufficiently low level relative to the tractor body without reducing the total height of the cab. A driver's seat may be installed relatively rearward to secure a spatial allowance forwardly of the driver seated on the driver's seat.

In a preferred embodiment of this invention, a hydraulic cylinder provided on a transmission case and usually below the driver's seat is disposed rearwardly and outside of the cab, whereby a rear portion of the cab may be disposed sufficiently close to an upper surface of the transmission case which is part of the body forming unit. As a result, the driver's seat disposed in a rearward portion of the cab may be disposed close to the upper surface of the transmission case. That is, the driver's seat may be disposed in the lowest possible position relative to the tractor body. The top of the cab may be lowered correspondingly.

In another preferred embodiment of the invention, the bottom wall of the cab has a recess formed in a central region thereof and extending in a longitudinally, the body forming unit being disposed in the recess. With this construction, the bottom wall of the cab, which usually is formed substantially flat, is recessed downward, and placed over the body forming unit. Thus, the cab may be installed as lowered relative to the tractor body without excessively reducing the height of the cab itself and without sacrificing the ground clearance of the tractor body. The tractor body including the cab has a reduced overall height while securing an accommodating space free of a feeling of vertical pressure.

In a further preferred embodiment of the invention, the cab has a windshield with an upper portion thereof curved or bent rearward to serve as a front end of a cab ceiling. This construction provides a good upper forward view, and a driving space free of a feeling of pressure.

Further, an air conditioner unit may be disposed in a position other than the ceiling of the cab to allow the cab to be low. Then, the entire tractor may have a reduced height, with the upper end of the cab at a reduced height over the ground, while providing an excellent driving environment. Where the air conditioner unit is disposed forwardly of the driver's seat, a spatial allowance is secured forwardly of the driver as a precondition. Compared with the case of installing the air conditioner unit in the ceiling of the cab, the upper end of the cab may have a reduced height over the ground while securing a driving space not impairing maneuverability in time of driving.

The cab may be arranged such that the air conditioner unit is disposed in a forward portion of the cab, a hydraulic cylinder is disposed rearwardly and outside of the cab for raising and lowering a working implement, and the driver's seat disposed in a rearward portion of the cab may be disposed adjacent the upper rear surface of the transmission case. In this case, the entire cab may be installed as lowered relative to the tractor body, with the air conditioner unit disposed forwardly of the driver's seat. Then, the entire tractor may have a reduced height, with the upper end of the cab at a reduced height over the ground, while providing an excellent driving environment.

The cab may have doors disposed on side planes thereof to be swingable open about hinge axes disposed adjacent the backrest of the driver's seat in side view. When such a door is opened, a large lateral area of the driver's seat is opened to facilitate boarding and alighting.

Preferably, the cab tractor according to this invention has a total height of approximately 1.7 m. Then, the tractor may easily move through an entrance of a greenhouse having a standard height (i.e. approximately 1.8 m). Further, the body forming unit may have a ground clearance of approximately 30 cm. This secures a ground clearance comparable to that of a standard tractor. The tractor according to this invention may perform varied operations while straddling ridges inside and outside a greenhouse. This tractor may also engage in a soil puddling operation and the like in a wet field where the wheels could sink to large extents.

Other features and advantages of this invention will be apparent from the following description of the embodiment to be taken with reference to the drawings.

DESCRIPTION OF THE PREFERRED EMBODIMENTS

Figure 1:
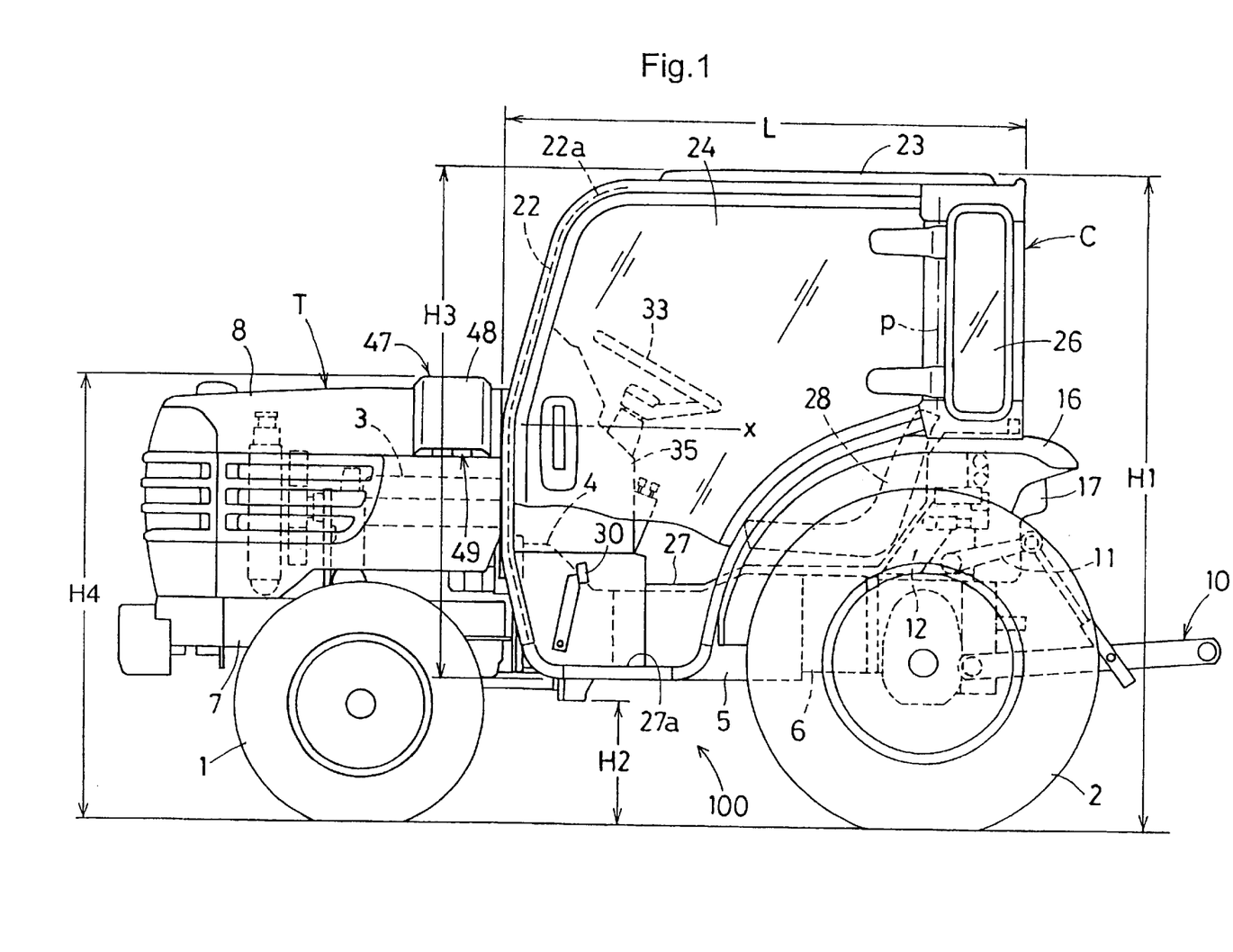
FIG. 1 is a side elevation of a tractor with a cab according to this invention.
Figure 2:
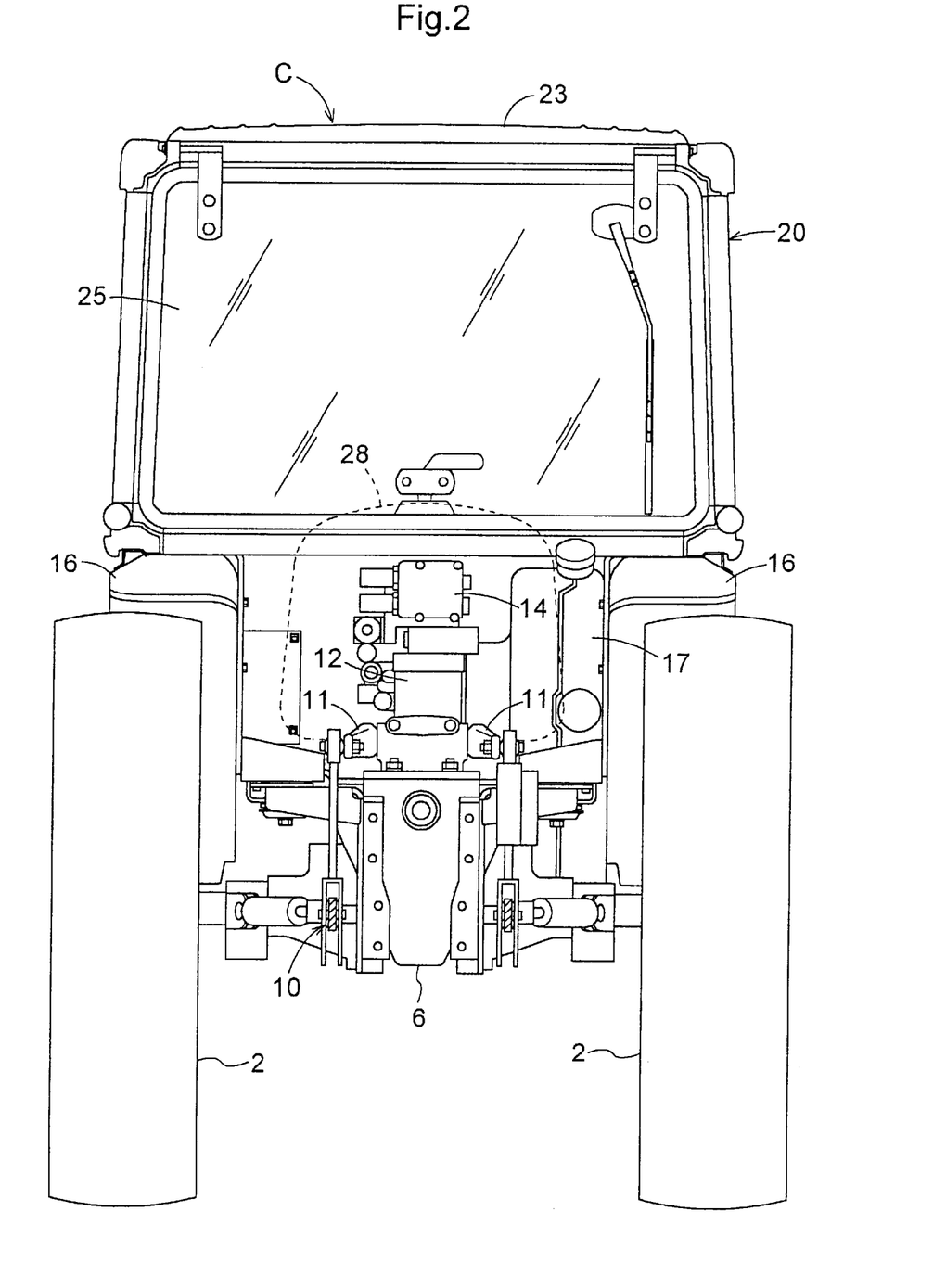
FIG. 2 is a rear view of the tractor.

FIG. 1 shows a tractor with a cab in one embodiment of this invention. This cab tractor has a cab C mounted on a four-wheel drive tractor body T having dirigible front wheels 1 and main propelling rear wheels 2. The tractor including the cab C has a low total height H1 of about 1.7 m (1.6 to 1.8 m) to be able to pass through an entrance of a greenhouse used for cultivation. The height of the lowermost portion of the tractor body T, that is a ground clearance H2 of a body forming unit 100 which is a central component of the tractor body T, is set to about 30 cm (30 to 30-odd cm). Thus, the tractor is capable of performing not only varied standard field operations performed by this type of tractor, but also soil puddling and other operations in wet rice fields.

The body forming unit 100 includes an engine 3, a clutch housing 4, a first transmission case 6, and a second transmission case 5 having a hydrostatic stepless transmission (not shown) connected in the stated order. The tractor body T includes, besides the body forming unit 100, a front axle case (not shown) supported for rolling from side to side by front frames 7 connected to a lower portion of engine 3. The right and left front wheels 1 are dirigibly supported by the front axle case. The right and left rear wheels 2 are attached to rear positions of the transmission case 6. The engine 3 is covered by a hood 8.

Figure 8:
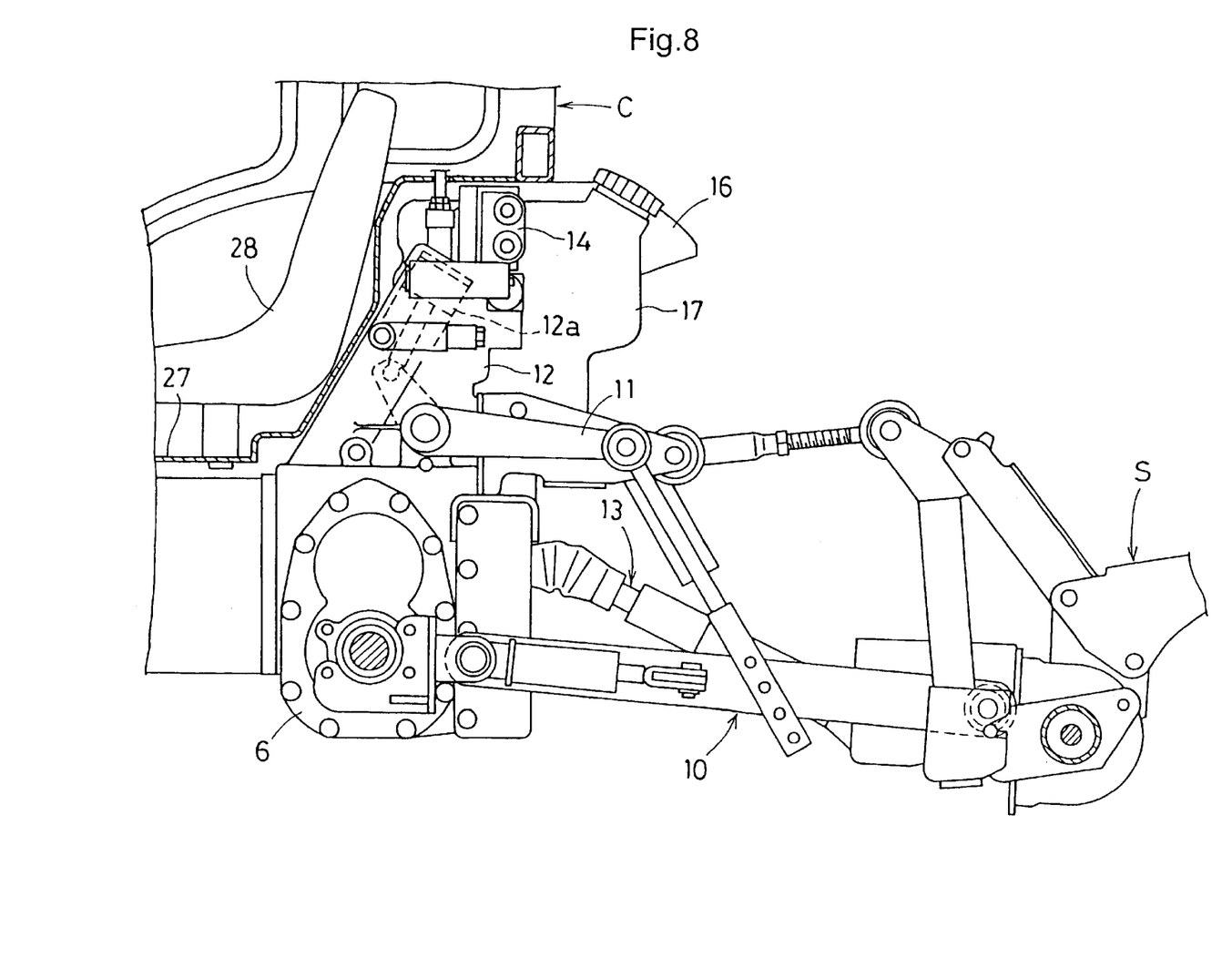
FIG. 8 is a side view of a rear portion of a vehicle body.

As shown in FIG. 8, a three-point link mechanism 10 is connected to the rear end of transmission case 6 for attaching a working implement S such as a rotary plow. The three-point link mechanism 10 is operatively connected to lift arms 11 attached to an upper rear surface of the transmission case 6. The lift arms 11 are driven by a hydraulic cylinder 12 mounted on the upper rear surface of the transmission case 6. Working drive taken out of the rear end of transmission case 6 is supplied to the working implement S by a transmission shaft device 13.

The hydraulic cylinder 12 is mounted on the upper rear surface of transmission case 6 as inclined slightly rearward, so that its piston 12a is movable up and down. A cylinder controlling electromagnetic valve 14 is mounted on an upper portion of a cylinder casing.

Figure 3:
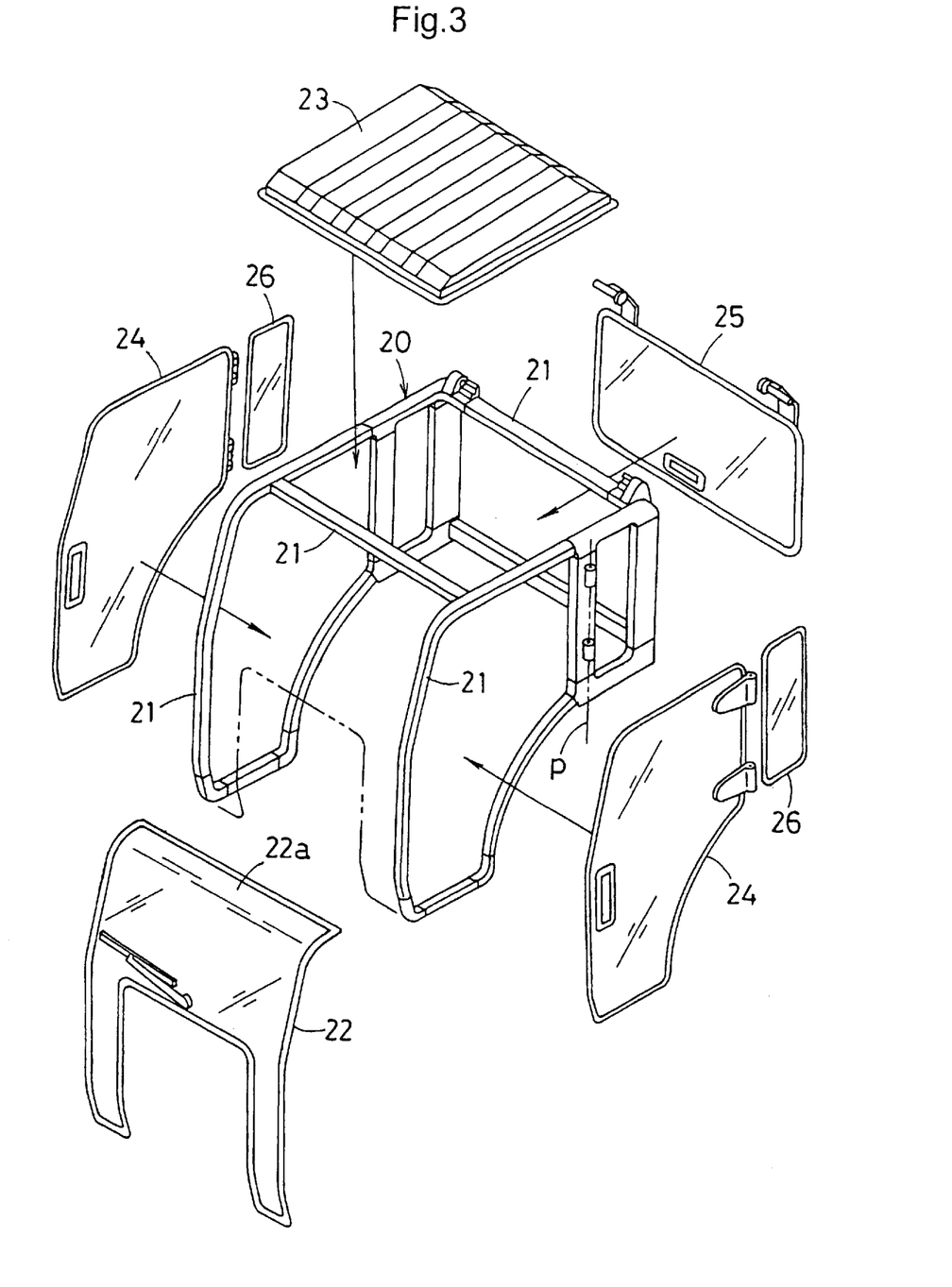
FIG. 3 is an exploded perspective view of the cab.

The cab C is disposed to extend from the rear of hood 8 to the rear of tractor body T. As shown in FIG. 3, the cab C has a box-like cab frame 20 formed of various frame members 21, with a windshield 22, a top panel 23, right and left doors 24, a rear openable window 25 and rear side windows 26 assembled thereto. The cab frame 20 has a bottom wall 27 (omitted from FIG. 3) connected to and extending over lower ends thereof.

As shown in FIG. 8, a rear portion of the bottom wall 27 of cab C is disposed at a low level adjacent the upper surface of transmission case 6 and forwardly of hydraulic cylinder 12 disposed rearwardly and outside of the cab C. A driver's seat 28 is disposed in a rear portion of the cab C to be adjacent and above the portion of bottom wall 27 disposed at the low level adjacent the upper surface of transmission case 6. Numeral 16 in FIG. 1 denotes rear wheel fenders. A fuel tank 17 is mounted inwardly of the right rear wheel fender 16.

Figure 7:
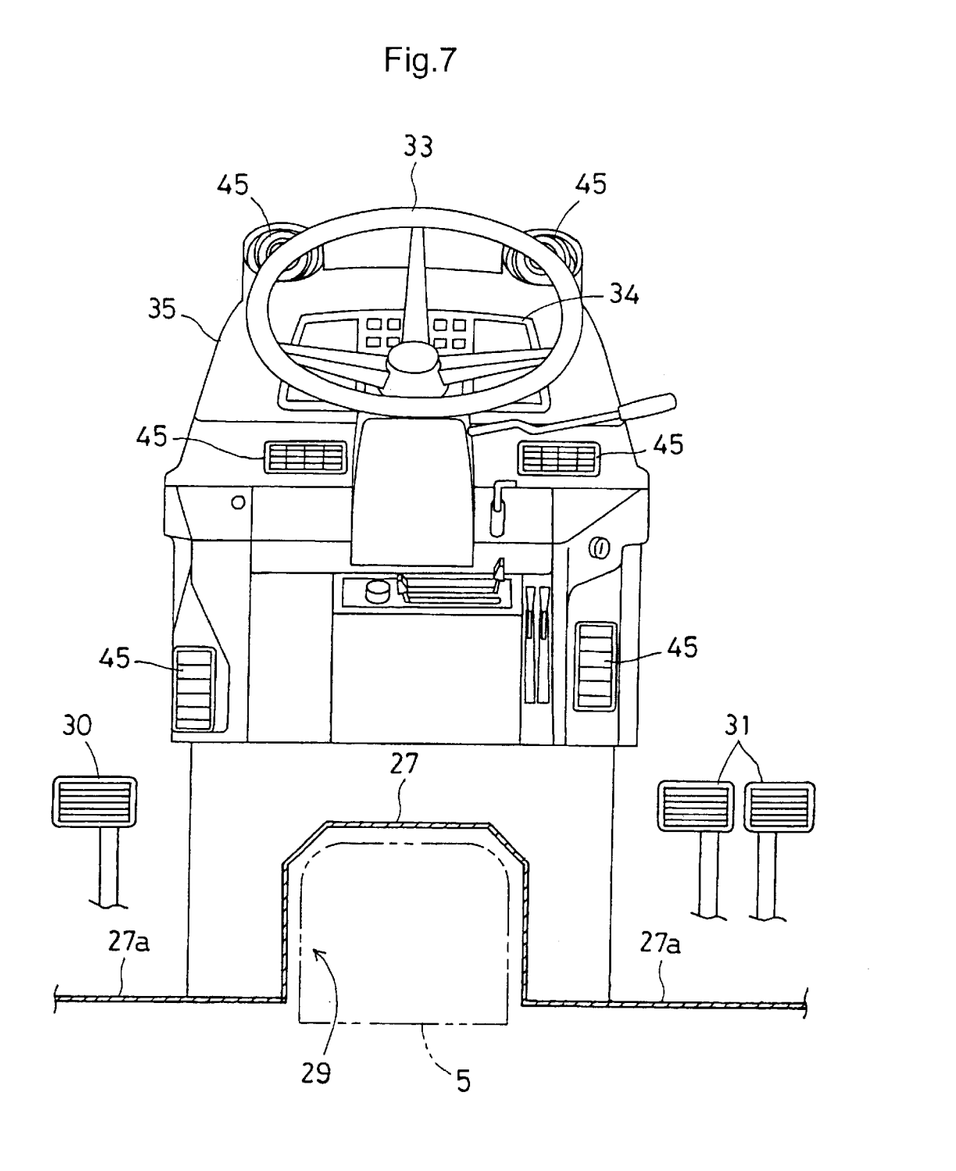
FIG. 7 is a front view showing a front portion inside the cab.

As shown in FIG. 7, the bottom wall 27 forwardly of the driver's seat 28 is lowered in right and left positions thereof with respect to the transversely middle position, thereby forming a recess 29 opening downward. The recess 29 covers, from above, the clutch housing 4 and transmission case 5 constituting the tractor body T. The right and left bottom wall portions 27a lowered with respect to the transversely middle position act as right and left footrests below the driver's seat 28. The depth of recess 29 is set so that the footrests 27a are level with the lower end of the transmission case 5. Thus, the driver may be seated on the driver's seat 28, with the legs spread so as to straddle the clutch housing 4 and transmission case 5 constituting the tractor body T, and the feet placed on the right and left footrests 27a. The driver's seat 28 has a seat surface at a height from the footrests 27a for allowing the driver to be seated with the legs bent in a comfortable way. A main clutch pedal 30 is disposed in a forward position on the left footstep 27a. A pair of right and left parking brake pedals 31 are disposed in a forward position on the right footstep 27a for independently braking the right and left rear wheels 2.

The right and left footrests 27a lowered to substantially the same level as the lower end of the component of the tractor body T form the lower end of the cab C. The upper end of the cab C is set to a height for allowing the driver to be seated on the driver's seat 28 without a feeling of pressure. As shown in FIG. 1, the entire cab C is installed as substantially lowered with respect to the tractor body T, such that a half level "x" in the total height H3 of the cab C is lower than the height H4 of the hood 8, i.e. the height level H4 of the rear end of the hood 8 in this embodiment. That is, compared with an ordinary cab having a substantially flat floor defining footrests, the cab C according to this invention is as a whole substantially lowered with respect to the tractor body T. In this way, the tractor body including the cab C has a reduced overall height without reducing the ground clearance.

The cab C has a total length L set larger than the total height H3 of the cab C to secure a sufficient capacity therein. The cab C has, installed therein, a drive panel case 35 including a steering wheel 33 and a meter panel 34. The drive panel case 35 contains an air conditioner unit 40 switchable between heating and cooling modes, as disposed above the clutch housing 4.

Figure 4:
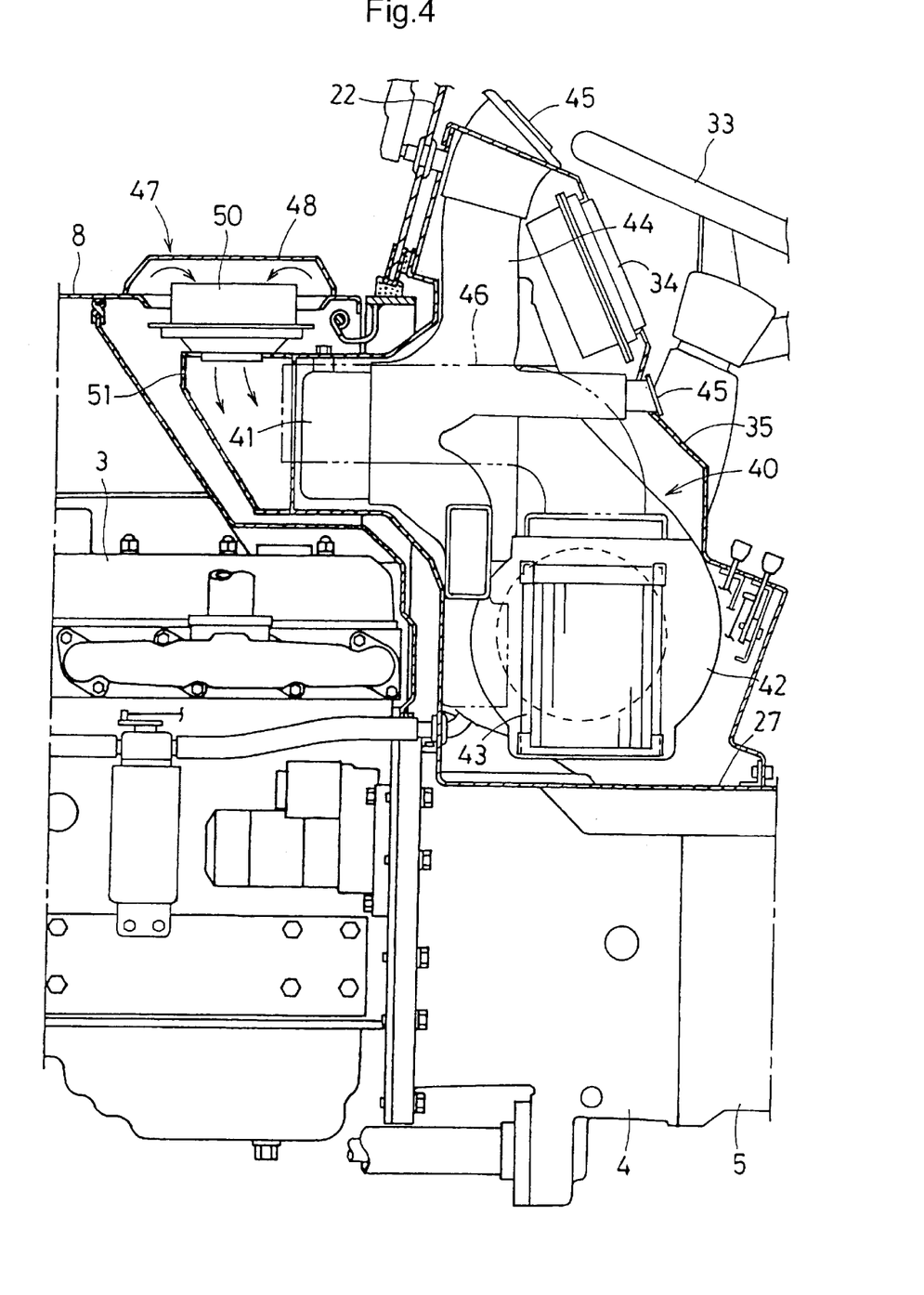
FIG. 4 is a side view in vertical section of an air conditioning unit and adjacent components.

The air conditioner unit 40 includes a heat exchanger 41, a ventilating fan 42, an air filter 43 and a flow duct 44. The flow duct 44 is branched and connected to supply openings 45 arranged in appropriate positions on the drive panel case 35. The air conditioner unit 40 is connected through a suction duct 46 to an ambient air intake 47 disposed in an upper rearward position of the hood 8.

Figure 5:
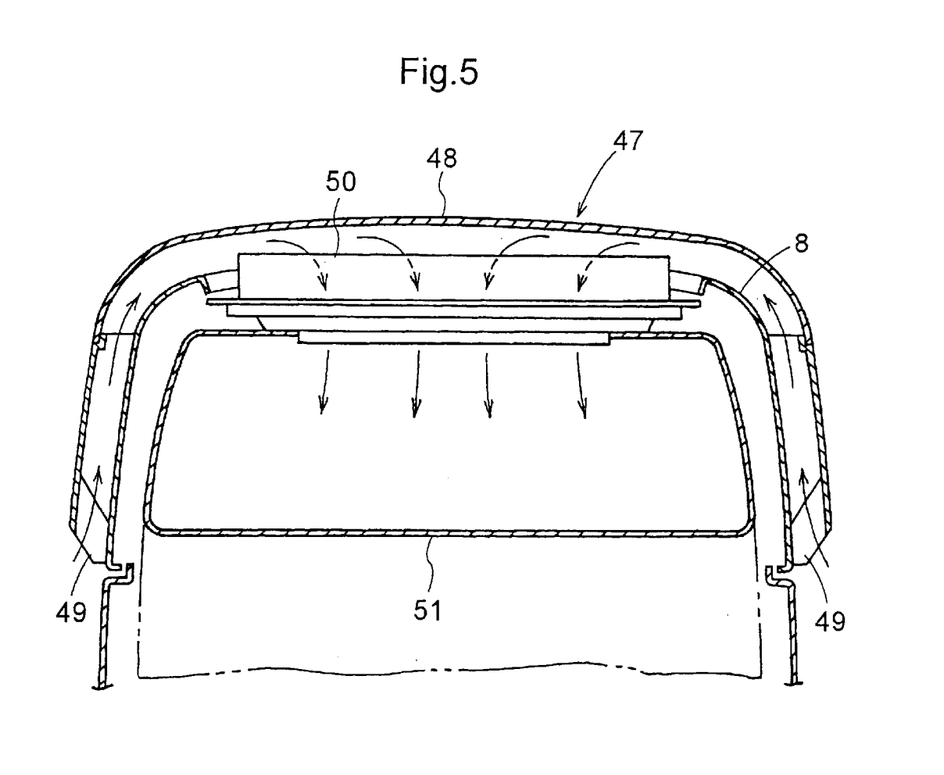
FIG. 5 is a front view in vertical section of an ambient air intake.
Figure 6:
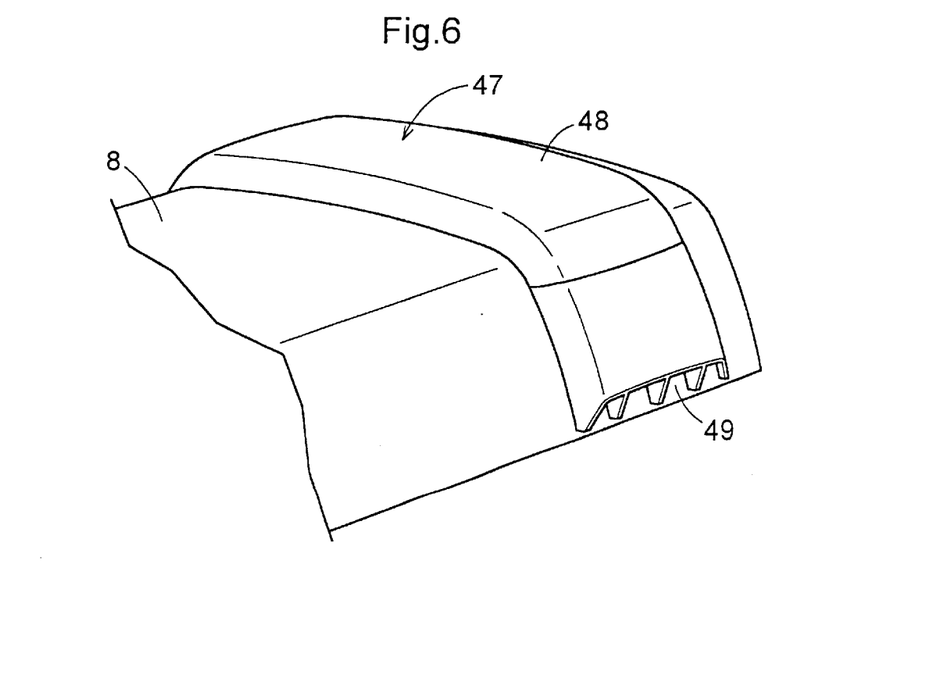
FIG. 6 is a perspective view of the ambient air intake.

As shown in FIGS. 4 and 5, the ambient air intake 47 has a suction cover 48 extending from an upper portion to right and left sides of the hood 8 and defining ambient air intake openings 49 at right and left lower ends. This construction does not permit entry of rain water or carwash water. Ambient air drawn into the suction cover 48 is cleaned by an air cleaner 50 and drawn to the suction duct 46 through a suction case 51. The air cleaner 50 is supported by the fixed suction case 51. By opening the hood 8, an area above the air cleaner 50 is opened to enable changing of elements.

The windshield 22 of the cab C has a recessed lower portion corresponding to an outer shape of the hood 8, to provide forward views from forward ends of the footrests 27a. The upper end of the windshield 22 is curved rearward to define a rearward bulge 22a forming part of the ceiling. Thus, a good upper forward view is provided even though the driver's seat 28 is disposed in the rear portion of the cab C. The right and left doors 24 are supported at rear ends thereof to be swingable open about hinge axes "p". The hinge axes "p" are disposed adjacent the backrest of driver's seat 28 in side view. Thus, the cab C has large entrances extending rearward to facilitate boarding and alighting.

[Another Embodiment]

Figure 9:
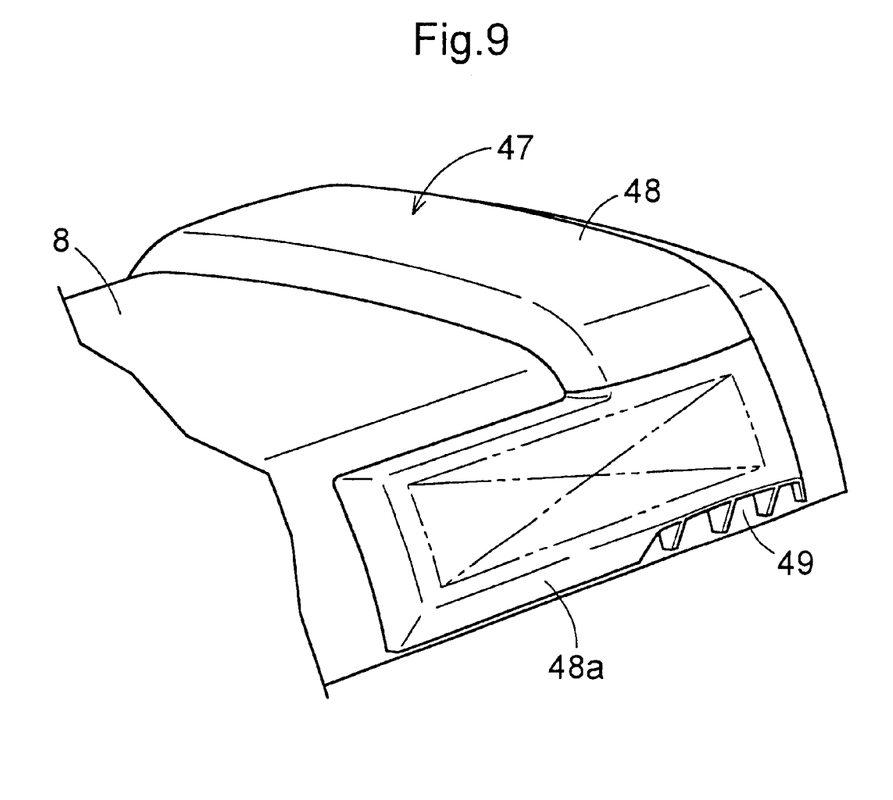
FIG. 9 is a perspective view of an ambient air intake in another embodiment.

As shown in FIG. 9, the ambient air intake 47 may include a long auxiliary suction cover 48a formed at each of the right and left ends of the suction cover 48 and extending in the fore and aft direction. The auxiliary suction cover 48a has an ambient air intake opening 49 formed in the rear of a lower end thereof. A face plate or label indicating the model may be attached to an outside surface of auxiliary suction cover 48a.

According to this invention, as described hereinbefore, a cab tractor with a reduced height is provided that has excellent utility. The tractor is capable of moving through a low entrance of a greenhouse while securing a sufficient accommodating space for the driver. The tractor body has a sufficient ground clearance to be capable of a wide range of operations from an ordinary field operation to a wet rice field operation in a smooth way.

What is claimed is:

1. A tractor comprising:
   a hood;
   a tractor body including a body forming unit, said tractor body including an engine enclosed by said hood, a first transmission case associated with rear wheels of the tractor, and a second transmission case disposed between said engine and said first transmission case;
   a cab mounted on said tractor body rearwardly of said hood and including a bottom wall, said cab having a driver's seat disposed in a rearward portion thereof;
   wherein said cab has a total length larger than a total height thereof;
   wherein said bottom wall of said cab has a recess extending in a lateral central region thereof and in a longitudinal direction of the tractor, said recess opening downwardly to receive said second transmission case, said bottom wall further having right and left footrests separated by said recess and defined forwardly of said driver's seat; and
   wherein said cab is arranged to have said right and left footrests substantially level with a lower end of said body forming unit.

2. A tractor as defined in claim 1, further comprising a hydraulic cylinder disposed rearwardly and outside of said cab for raising and lowering a working implement, said driver's seat being disposed adjacent an upper surface of said first transmission case.

3. A tractor as defined in claim 1, wherein said cab has a windshield with an upper portion thereof curved or bent rearward.

4. tractor as defined in claim 1, further comprising an air conditioner unit disposed in a position other than a ceiling of the cab to allow the cab to be low.

5. A tractor as defined in claim 1, wherein said cab has doors disposed on side planes thereof to be swingable open about hinge axes, respectively, disposed adjacent a backrest of said driver's seat in side view.

6. A tractor as defined in claim 1, wherein the total height of the tractor is approximately 1.7 m.

7. A tractor as defined in claim 1, wherein said body forming unit has a ground clearance of approximately 30 cm.

8. A tractor as defined in claim 4, wherein said air conditioner unit is disposed forwardly of said driver's seat.

9. A tractor as defined in claim 4, wherein said cab is arranged such that said air conditioner unit is disposed in a forward portion of the cab, a hydraulic cylinder is disposed rearwardly and outside of the cab for raising and lowering a working implement, and said driver's seat is disposed adjacent an upper surface of said first transmission case.

10. A tractor comprising:
    a hood;
    a tractor body including a body forming unit, said tractor body including an engine enclosed by said hood, a first transmission case associated with rear wheels of the tractor, and a second transmission case disposed between said engine and said first transmission case;
    a cab mounted on said tractor body rearwardly of said hood and including a bottom wall, said cab having a driver's seat disposed in a rearward portion thereof;
    wherein said cab has a total length larger than a total height thereof;
    wherein said bottom wall of said cab has a recess extending in a lateral central region thereof and in a longitudinal direction of the tractor, said recess opening downwardly to receive said second transmission case, said bottom wall further having right and left footrests separated by said recess and defined forwardly of said driver's seat; and
    wherein said cab has an intermediate height level lower than a height level of said hood.

11. A tractor as defined in claim 10, further comprising a hydraulic cylinder disposed rearwardly and outside of said cab for raising and lowering a working implement, said driver's seat being disposed adjacent an upper surface of said first transmission case.

12. A tractor as defined in claim 10, wherein said cab has a windshield with an upper portion thereof curved or bent rearward.

13. A tractor as defined in claim 10, comprising an air conditioner unit disposed in a position other than a ceiling of the cab to allow the cab to be low.

14. A tractor as defined in claim 10, wherein said cab has doors disposed on side planes thereof to be swingable open about hinge axes, respectively, disposed adjacent a backrest of said driver's seat in side view.

15. A tractor as defined in claim 10, wherein the total height of the tractor is approximately 1.7 m.

16. A tractor as defined in claim 10, wherein said body forming unit has a ground clearance of approximately 30 cm.

17. A tractor as defined in claim 11, wherein said air conditioner unit is disposed forwardly of said driver's seat.

18. A tractor as defined in claim 11, wherein said cab is arranged such that said air conditioner unit is disposed in a forward portion of the cab, a hydraulic cylinder is disposed rearwardly and outside of the cab for raising and lowering a working implement, and said driver's seat is disposed adjacent an upper surface of said first transmission case.

19. A tractor comprising:

a hood;

a tractor body including a body forming unit, said tractor body including an engine enclosed by said hood, a first transmission case associated with rear wheels of the tractor, and a second transmission case disposed between said engine and said first transmission case;

a cab mounted on said tractor body rearwardly of said hood and including a bottom wall, said cab having a driver's seat disposed in a rearward portion thereof;

wherein said cab has a total length larger than a total height thereof;

wherein said bottom wall of said cab has a recess extending in a lateral central region thereof and in a longitudinal direction of the tractor, said recess opening downwardly to receive said second transmission case, said bottom wall further having right and left footrests separated by said recess and defined forwardly of said driver's seat;

wherein said cab is arranged to have said right and left footrests substantially level with a lower end of said body forming unit; and wherein said cab has an intermediate height level lower than a height level of said hood.

20. A tractor as defined in claim 19, further comprising a hydraulic cylinder disposed rearwardly and outside of said cab for raising and lowering a working implement, said driver's seat being disposed adjacent an upper surface of said first transmission case.

21. A tractor as defined in claim 19, wherein said cab has a windshield with an upper portion thereof curved or bent rearward.

22. A tractor as defined in claim 19, further comprising an air conditioner unit disposed in a position other than a ceiling of the cab to allow the cab to be low.

23. A tractor as defined in claim 19, said cab has doors disposed on side planes thereof to be swingable open about hinge axes, respectively, disposed adjacent a backrest of said driver's seat in side view.

24. A tractor as defined in claim 19, the total height of the tractor is approximately 1.7 m.

25. A tractor as defined in claim 19, wherein said body forming unit has a ground clearance of approximately 30 cm.

26. A tractor as defined in claim 22, wherein said air conditioner unit is disposed forwardly of said driver's seat.

27. A tractor as defined in claim 22, wherein said cab is arranged such that said air conditioner unit is disposed in a forward portion of the cab, a hydraulic cylinder is disposed rearwardly and outside of the cab for raising and lowering a working implement, and said driver's seat is disposed adjacent an upper surface of said first transmission case.

* * * * *

UNITED STATES PATENT AND TRADEMARK OFFICE
CERTIFICATE OF CORRECTION

PATENT NO. : 6,752,228 B2
DATED : June 22, 2004
INVENTOR(S) : Aoyama et al.

It is certified that error appears in the above-identified patent and that said Letters Patent is hereby corrected as shown below:

<u>Title page,</u>
Item [56], References Cited, U.S. PATENT DOCUMENTS, the following references should be added:

-- 2,969,255 A         1/1961        Nystrom
   4,669,564 A         6/1987        Kreutz --
FOREIGN PATENT DOCUMENTS, the following reference should be added:
-- FR 2,138,423 A     1/1973 --
Item [57], ABSTRACT
Line 2, "tractor body (T)" should read -- tractor body --
Line 7, "height level (x)" should read -- height level --

<u>Column 6,</u>
Line 26, "tractor as defined" should read -- A tractor as defined --

<u>Column 7,</u>
Line 9, "claim 10, comprising" should read -- claim 10, further comprising --.

<u>Column 7,</u>
Lines 21 and 23, "in claim 11" should read -- in claim 13 --.

<u>Column 8,</u>
Line 23, "in claim 19, said cab" should read -- in claim 19, wherein said cab --.
Line 27, "in claim 19, the total" should read -- in claim 19, wherein the total --.

Signed and Sealed this

Twenty-first Day of December, 2004

JON W. DUDAS
*Director of the United States Patent and Trademark Office*